(12) United States Patent
Akiyama

(10) Patent No.: US 6,268,963 B1
(45) Date of Patent: Jul. 31, 2001

(54) OPTICAL SYSTEM HAVING A REFLECTING SURFACE

(75) Inventor: Takeshi Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/137,495

(22) Filed: Aug. 20, 1998

(30) Foreign Application Priority Data

Aug. 22, 1997 (JP) .................................................... 9-242212

(51) Int. Cl.$^7$ ................................................ G02B 27/14
(52) U.S. Cl. ................................................ 359/631; 359/630
(58) Field of Search ........................... 350/55, 505, 538; 359/561, 858, 729, 631, 633, 726, 727, 730, 731, 732, 366, 630, 636, 637

(56) References Cited

U.S. PATENT DOCUMENTS

| 3,674,334 | 7/1972 | Offner ................................. 350/55 |
| 4,265,510 | 5/1981 | Cook .................................... 350/55 |
| 4,655,555 | 4/1987 | Mächler et al. ....................... 359/365 |
| 4,737,021 | 4/1988 | Korsch ................................. 350/505 |
| 4,747,678 | 5/1988 | Shafer et al. ........................ 359/366 |
| 4,775,217 | 10/1988 | Ellis ................................... 350/538 |
| 5,063,586 | 11/1991 | Jewell et al. .......................... 378/34 |
| 5,078,502 | * 1/1992 | Cook ................................... 359/366 |
| 5,153,773 | * 10/1992 | Muraki et al. ....................... 359/619 |
| 5,309,276 | 5/1994 | Rodgers ............................... 359/366 |
| 5,917,662 | * 6/1999 | Sekita .................................. 359/729 |

FOREIGN PATENT DOCUMENTS

| 0 144 950 | 6/1985 | (EP) . |
| 0 790 513 | 8/1997 | (EP) . |
| 0 814 596 | 12/1997 | (EP) . |
| 2-297516 | 12/1990 | (JP) . |
| 5-12704 | 1/1993 | (JP) . |
| 6-139612 | 5/1994 | (JP) . |

* cited by examiner

Primary Examiner—Ricky Mack
(74) Attorney, Agent, or Firm—Fitzpatrick, Cella, Harper & Scinto

(57) ABSTRACT

An optical system has a stop and a plurality of curved reflecting surfaces, the optical paths of rays of light successively reflected by the plurality of curved reflecting surfaces and arriving at the center of an image plane via the center of the stop intersecting with each other twice.

31 Claims, 11 Drawing Sheets

OPTICAL SYSTEM HAVING A REFLECTING SURFACE

BACKGROUND OF THE INVENTION

1. Field of the Invention

This invention relates to an optical system having a reflecting surface, and particularly to an optical system for forming the image of an object on the surface of an image pickup element such as silver halide film or a CCD by the use of an optical element provided with an incidence surface, an emergence surface and a plurality of reflecting surfaces on the surface of a transparent member. This optical system is suitable for a video camera, a still video camera and an image pickup apparatus such as a copying apparatus.

2. Related Background Art

There have heretofore been proposed various phototaking optical systems utilizing the reflecting surface of concave mirror, a convex mirror or the like. FIG. 9 of the accompanying drawings is a schematic view of a so-called mirror optical system comprising a concave mirror and a convex mirror.

In the mirror optical system of FIG. 9, an object light beam 104 from an object is reflected by the concave mirror 101, whereby it travels toward the object side while being converged, and impinges on the convex mirror 102. The light beam 102 is further reflected by the convex mirror 102, and hereafter it is imaged on an image plane 103.

This mirror optical system has the same construction as that of a so-called Cassegrainian type reflection telescope, and the optical path of a telephoto lens system comprised of a refracting lens which is long in the full length of the optical system is folded by the use of a reflecting mirror, whereby the full length of the optical system can be shortened.

Besides the Cassegrainian type, there are known a number of mirror optical systems of which the full length is shortened by the use of a plurality of reflecting mirrors.

Generally, in a mirror optical system such as the Cassegrainian type reflection telescope, there is the problem that part of the object light beam 104 is eclipsed by the convex mirror 102. This problem is attributable to the fact that the convex mirror 102 is in the passage area of the object light beam 104.

In order to solve this problem, there has also been proposed a mirror phototaking optical system used with the principal ray of the object light beam 104 spaced apart from an optical axis 105.

FIG. 10 of the accompanying drawings is a schematic view of a mirror optical system disclosed in U.S. Pat. No. 3,674,334, and the center axis itself of the reflecting surface of a reflecting mirror is made eccentric relative to an optical axis 114 and at the same time, the principal ray 116 of an object light beam 115 is spaced apart from the optical axis 114 to thereby solve the above-mentioned problem of eclipse.

The mirror optical system of FIG. 10 has a concave mirror 111, a convex mirror 113 and a concave mirror 112 in the order of passage of the light beam, but as indicated by dots-and-dash line, they originally are portions of reflecting mirrors rotation-symmetrical with respect to the optical axis 114. Of these, only the upper portion of the concave mirror 111 relative to the optical axis 114 as viewed in FIG. 10, only the lower portion of the convex mirror 113 relative to the optical axis 114 as viewed in FIG. 10 and only the lower portion of the concave mirror 112 relative to the optical axis 114 as viewed in FIG. 10 are used, whereby there is constructed an optical system in which the principal ray 116 of the object light beam 115 is spaced apart from the optical axis 114 and the eclipse of the object light beam 115 is eliminated.

FIG. 11 of the accompanying drawings is a schematic view of a mirror optical system disclosed in U.S. Pat. No. 5,063,586.

In FIG. 11, when an axis passing through the center of an object surface 121 perpendicular to the object surface 121 is defined as an optical axis 127, the central coordinates and center axes of the reflecting surfaces of a convex mirror 122, a concave mirror 123, a convex mirror 124 and a concave mirror 125 arranged in the order of passage of a light beam (the axes linking the centers of the reflecting surfaces and the centers of curvature of the surfaces) 122a, 123a, 124a and 125a are eccentric relative to the optical axis 127. In FIG. 11, the amount of eccentricity at this time and the radius of curvature of each surface are appropriately set to thereby prevent the eclipse of an object light beam 128 by each reflecting mirror and image the object light beam 128 efficiently on an imaging plane 126.

U.S. Pat. No. 4,737,021 and U.S. Pat. No. 4,265,510 also disclose a construction in which as in the optical system of FIG. 10, eclipse is avoided by the use of a portion of a reflecting mirror rotation-symmetrical with respect to the optical axis, or a construction in which as in the optical system of FIG. 11, the center axis itself of a reflecting mirror is made eccentric relative to the optical axis to thereby avoid eclipse.

FIG. 12 of the accompanying drawings shows an a focal optical system for observation using four reflecting surfaces disclosed in U.S. Pat. No. 5,309,276. In FIG. 12, four mirrors 201 to 204 are disposed so that a light beam from an object, not shown, lying at the left as viewed in FIG. 12 may be reflected by the first mirror 201, the second mirror 202, the third mirror 203 and the fourth mirror 204 in the named order, and may pass the front of the first mirror 201 twice, and then may emerge from the fourth mirror in a direction perpendicular to the direction of incidence of incident light 200 and may be imaged on an observer's pupil 205.

These reflecting optical systems have required many constituent parts, and to obtain necessary optical performance, it has been necessary to assemble respective optical parts with good accuracy. Particularly, the accuracy of the relative position of the plurality of reflecting mirrors has been severe and therefore, the adjustment of the position and angle of each reflecting mirror has been requisite.

As a method for solving this problem, it has been proposed to construct, for example, a mirror system having a plurality of reflecting mirrors (surfaces) by a single element.

As an element having a plurality of reflecting surfaces, there is a pentagonal roof prism used, for example, in a finder system or the like, or an optical prism such as a porroprism.

In these prisms, the plurality of reflecting surfaces are formed integrally with one another and therefore, the relative positional relation among the reflecting surfaces is made accurate and the mutual positional adjustment of the reflecting surfaces becomes unnecessary. The main function of these prisms is to change the direction of travel of rays of light to thereby effect the reversal of an image, and each reflecting mirror is comprised of a flat surface.

In contrast, there is also known an optical system in which a reflecting surface (reflecting mirror) formed on a prism is endowed with a curvature (refracting power).

FIG. 13 is a schematic view of the essential portions of an observation optical system disclosed in U.S. Pat. No. 4,775, 217. This observation optical system for observing therethrough a scene of the outside and a display image displayed on an information display member as they are made to overlap each other.

In this observation optical system, a light beam 145 emerging from the display image on the information display member 141 enters from the incidence surface 148 of a prism, is reflected by a surface 142 and travels toward the scene at the left as viewed in FIG. 13, and enters a concave surface 143 comprising a half mirror. The display light beam 145 is reflected by this concave half mirror 143, and becomes a parallel light beam in which rays of light are substantially parallel to one another by the refracting power of the concave surface 143, and is refracted by and transmitted through the surface 142 to thereby form the enlarged virtual image of the display image, and enters an observer's pupil 144, and the display image enlarged thereby is recognized by the observer.

On the other hand, an object light beam 146 from the scene enters a surface 147 substantially parallel to the reflecting surface 142, and is refracted by the surface 147 and arrives at the concave surface 143 comprising the half mirror. The concave half mirror 143 has semi-transmitting film deposited by evaporation thereon, and a part of the object light beam 146 is transmitted through the concave half mirror 143, and is refracted by and transmitted through the surface 142 and enters the observer's pupil 144. Thereby, the observer visually confirms the display image in the scene of the outside as it overlaps the latter.

FIG. 14 of the accompanying drawings is a schematic view of the essential portions of an observation optical system disclosed in Japanese Laid-Open Patent Application No. 2-297516. Again through this observation optical system, the observer observes a scene of the outside and also observes a display image displayed on an information display member as it overlaps the former.

In this observation optical system, a display light beam 154 emerging from the information display member 150 is transmitted through a flat surface 157 constituting a prism Pa, enters the prism Pa and impinges on a reflecting surface 151 comprising a parabolic surface. The display light beam 154 is reflected by this reflecting surface 151 and becomes a convergent light beam, and is imaged on a focal plane 156. At this time, the display light beam 154 reflected by the reflecting surface 151 arrives at the focal plane 156 while being totally reflected between two parallel flat surfaces 157 and 158 constituting the prism Pa, whereby the thinning of the entire optical system is achieved.

Next, a display light beam 154' emerging as divergent light from the focal plane 156 impinges on a half mirror 152 comprising a parabolic surface while being totally reflected between the flat surfaces 157 and 158, and is reflected by this half mirror 152 and at the same time, forms the enlarged virtual image of the display image by the refracting power thereof and also becomes a substantially parallel light beam, and is transmitted through the surface 157 and enters an observer's pupil 153, whereby the display image is recognized by the observer.

On the other hand, an object light beam 155 from the outside is transmitted through a surface 158b constituting a prism Pb, is transmitted through the half mirror 152 comprising a parabolic surface, is transmitted through the surface 157 and enters the observer's pupil 153. The observer visually confirms the display image in the scene of the outside as it overlaps the latter.

Further, as an example using a prism-shaped optical element having a reflecting surface, there are optical heads for light pickup disclosed, for example, in Japanese Laid-Open Patent Application No. 5-12704 and Japanese Laid-Open Patent Application No. 6-139612. In these, light from a semiconductor laser is reflected by a Fresnel surface or a hologram surface, whereafter it is imaged on the surface of a disc, and the light from the disc is directed to a detector.

The present applicant has proposed an image pickup apparatus provided with an optical system having one or more optical elements having a plurality of curved or flat reflecting surfaces formed integrally with one another.

FIG. 15 of the accompanying drawings shows an example of this optical system and in FIG. 15, the reference numeral 51 designates an optical element in which a plurality of reflecting surfaces having curvatures are formed integrally with one another, and the element 51 is a transparent optical element having fine reflecting surfaces, i.e., a concave refracting surface R2, a concave mirror R3, a convex mirror R4, a concave mirror R5, a convex mirror R6 and a concave mirror R7, and a convex refracting surface R8 in succession from the object side, and the direction of a reference axis (light beam) entering the optical element 51 and the direction of a reference axis (light beam) emerging from the optical element 51 are substantially parallel to each other and opposite to each other. The reference numeral 52 denotes an optical correcting plate such as a rock crystal low-pass filter or an infrared cut filter, the reference numeral 53 designates the light receiving surface of an image pickup element such as a CCD, the reference numeral 54 denotes a stop disposed at the object side of the optical element 51, and the reference numeral 55 designates the reference axis of such a phototaking optical system.

In FIG. 15, light 56 from an object which is an object to be photographed has its amount of incidence regulated by the stop 54, and thereafter enters the concave refracting surface R2 of the optical element 51.

The light having entered the concave refracting surface R2 is made into divergent light by the power of the concave refracting surface R2, whereafter it is reflected by the concave mirror R3, is focused on an intermediate imaging plane N1 by the power of the concave mirror R3 and forms the image of the object on the plane N1.

The object light 56 temporarily imaged on the intermediate imaging plane N1 is repeatedly reflected by the convex mirror R4, the concave mirror R5, the convex mirror R6 and the concave mirror R7 and arrives at the convex refracting surface R8 while being affected by the power of the respective reflecting mirrors, and is refracted by the power of the convex refracting surface R8 and forms the image of the object on the light receiving surface 3 of the image pickup element.

SUMMARY OF THE INVENTION

It is the object of the present invention to provide an optical system having a reflecting surface which is compact but can obtain desired optical performance.

One aspect of the optical system of the present invention has a stop and a plurality of curved reflecting surfaces, and the optical paths of rays of light successively reflected by the plurality of curved reflecting surfaces and arriving at the center of an image plane via the center of the stop intersect with the optical path itself by any of twice, three times and four times.

In the above-described aspect, the optical paths of the rays of light intersect with one another only twice.

In the above-described aspect, an opening in the stop and the image plane are parallel to each other.

In the above-described aspect, the stop is provided at the light incidence side of a system comprising the plurality of curved reflecting surfaces.

In the above-described aspect, one of the plurality of curved reflecting surfaces which is nearest to the stop is a concave surface.

In the above-described aspect, each of the plurality of curved reflecting surfaces comprises a rotation-asymmetrical aspherical surface and the rays of light obliquely impinge thereon.

In the above-described aspect, the number of the curved reflecting surfaces is four, the optical paths of the rays of light intersect with one another only twice, the stop is provided at the light incidence side of a system comprising the four curved reflecting surfaces, one of the four curved reflecting surfaces which is nearest to the stop is a concave surface, an opening in the stop and the image plane are parallel to each other, each of the plurality of curved reflecting surfaces comprises a rotation-asymmetrical aspherical surface and the rays of light obliquely impinge thereon, the plurality of curved reflecting surfaces are supplied onto a transparent member such as glass or plastic, the rays of light are successively reflected by the plurality of curved reflecting surfaces while propagating through the interior of the transparent member, and both of the light incidence surface and the light emergence surface of the transparent member are curved surfaces.

Another aspect of the optical system of the present invention has a plurality of curved reflecting surfaces, and the optical paths of the rays of light of a light flux successively reflected by the plurality of curved reflecting surfaces intersect with one another twice to four times.

In the another aspect, the optical paths of the rays of light intersect with one another only twice.

In the another aspect, the direction in which the light enters the optical system and the direction in which the light emerges from the optical system are the same.

In the another aspect, a stop is provided at the light incidence side of a system comprising the plurality of curved reflecting surfaces.

In the another aspect, one of the plurality of curved reflecting surfaces which is nearest to the stop is a concave surface.

In the another aspect, each of the plurality of curved reflecting surfaces comprises a rotation-asymmetrical aspherical surface, and the rays of light obliquely impinge thereon.

In the another aspect, the number of the curved reflecting surfaces is four, the optical paths of the rays of light intersect with one another only twice, a stop is provided at the light incidence side of a system comprising the four curved reflecting surfaces, one of the four curved reflecting surfaces which is nearest to the stop is a concave surface, an opening in the stop and the image plane are parallel to each other, each of the plurality of curved reflecting surfaces comprises a rotation-asymmetrical aspherical surface, the rays of light obliquely impinge thereon, the plurality of curved reflecting surfaces are supplied onto a transparent member such as glass or plastic, the rays of light are successively reflected by the plurality of curved reflecting surfaces while propagating through the interior of the transparent member, and both of the light incidence surface and the light emergence surface of the transparent member are curved surfaces Also, according to the present invention, there are provided an image pickup apparatus and an observation apparatus having the optical system in each of the above-described forms.

DESCRIPTION OF THE PREFERRED EMBODIMENTS

Before starting the description of some embodiments of the present invention, the manner of representing the constituent elements of the embodiments described in this application and items common to all the embodiments will hereinafter be described with reference to FIG. 1.

Figure 1:
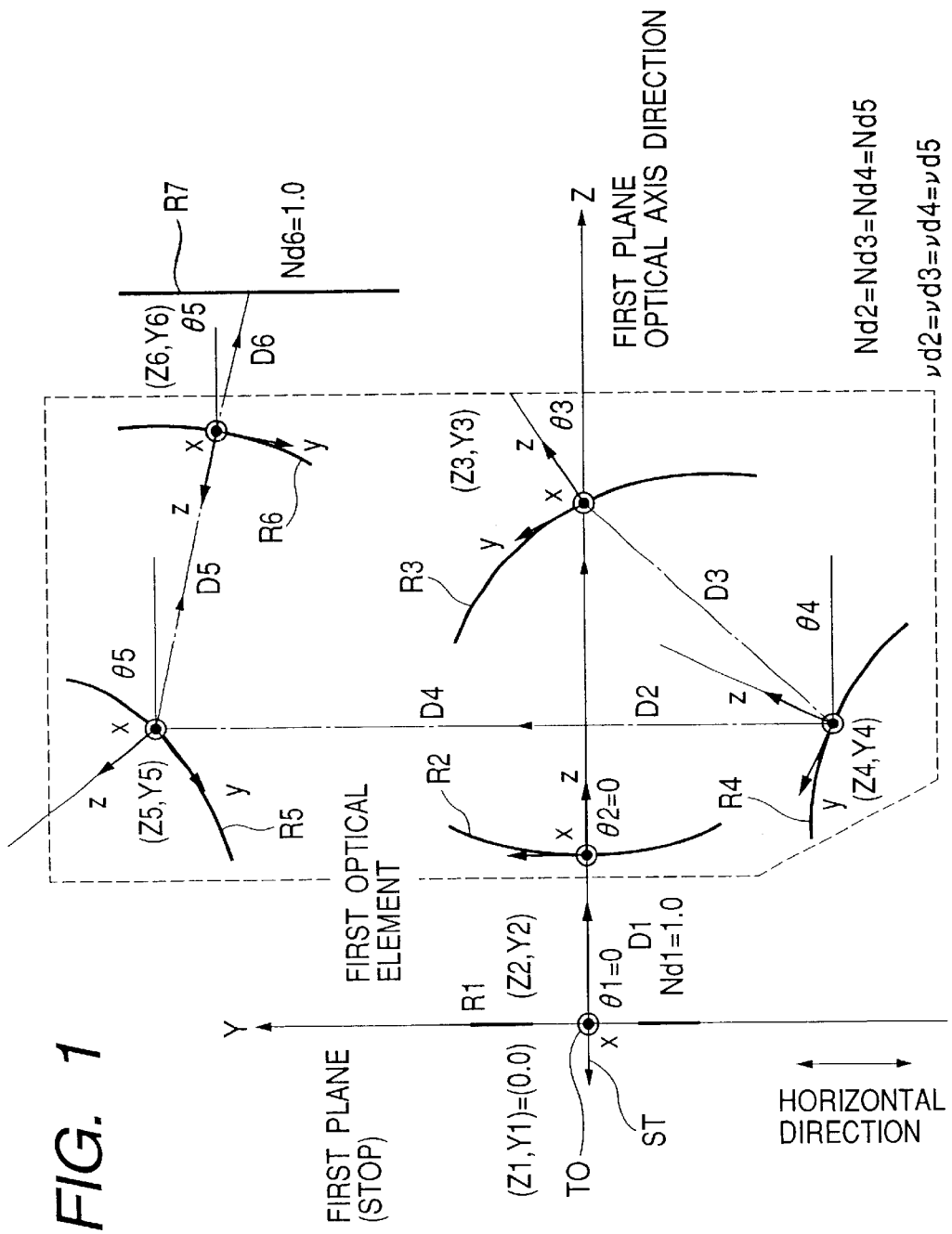
FIG. 1 is an illustration of a coordinates system in an embodiment of the present invention.

FIG. 1 is an illustration of a coordinate system which defines the constituent data of a phototaking optical system (optical system). In the embodiments, the ith surface along a ray of light (indicated by dot-and-dash line in FIG. 1 and called the standard axis ray of light) travelling from the object side to an image plane is defined as the ith surface.

In FIG. 1, the first surface R1 is a stop, the second surface R2 is a refracting surface coaxial with the first surface R1, the third surface R3 is a reflecting surface tilted (eccentric) relative to the second surface R2, the fourth surface R4 and the fifth surface R5 are reflecting surfaces shifted and tilted (eccentric) relative to the respective surfaces R3 and R4 forward thereof, and the sixth surface R6 is a refracting surface shifted and tilted relative to the fifth surface R5. Each of the second surface R2 to the sixth surface R6 is set on the surface of a transparent member formed of a medium such as glass or plastic and which constitutes an optical element 10.

In the construction of FIG. 1, the medium between an object surface, not shown, and the second surface R2 is constituted by air, the medium between the second surface R2 to the sixth surface R6 is constituted by a certain common medium comprising a transparent material, and the medium between the sixth surface R6 and a lens surface, not shown, or the seventh surface R7 such as a reflecting surface or an imaging plane is constituted by air.

Since several phototaking optical systems shown in this application are eccentric optical systems, the surfaces constituting the optical system have no common optical axis. So, in the embodiments, an absolute coordinate system having the center of the effective diameter of the ray of light of the first surface R1 as the origin is first set.

In the embodiments, the central point of the effective diameter of the ray of light of the first surface R1 is defined as the origin T0 and the route of a ray of light (standard axis ray of light) passing through the origin and the center of the final imaging plane is defined as the standard axis ST of the optical system. Further, the standard axis ST in the embodiments has a direction. As regards the direction, the direction in which the standard axis ray of light travels during imaging is positive.

In the embodiments, the standard axis which is the standard of the optical system is set as described above, but the way of determining the axis which becomes the standard of the optical system can adopt an axis convenient in optical design, in the decision of aberrations or in expressing the shape of each surface constituting the optical system. For example, the route of a ray of light passing through the center of the image plane and the stop or the entrance pupil or the exit pupil or the center of the first surface of the optical system or the center of the last surface of the optical system may be set as a standard axis which is the standard of the optical system.

In the embodiments, the route along which a ray of light passing through the central point of the first surface R1, i.e., the effective diameter of the ray of light of the surface of the stop to the center of the final imaging plane (the standard axis ray of light) is refracted and reflected by each refracting surface and each reflecting surface is set as the standard axis. The order of the surfaces is set to the order in which the standard axis ray of light is subjected to refraction and reflection.

Accordingly, the standard axis has its direction changed along the order of the surfaces in accordance with the law of refraction or reflection and yet finally arrives at the center of the image plane.

The tilted refracting surfaces and reflecting surfaces constituting the optical system of each embodiment are all basically tilted in the same plane. So, the respective axes of an absolute coordinates system (X, Y, Z) are defined as follows:

Z-axis: the standard axis passing through the origin T0 toward the second surface R2;

Y-axis a straight line passing through the origin T0 and counter-clockwisely forming 90° with respect to the X-axis in a tilt plane (the plane of the drawing sheet of FIG. 1); and X-axis: a straight line passing through the origin T0 and perpendicular to the Z-axis and Y-axis (a straight line perpendicular to the plane of the drawing sheet of FIG. 1).

Also, to represent the surface shape of the ith surface constituting the optical system, it is easier to understand in recognizing the shape to set a local coordinate system having as the origin the point at which the standard axis ST and the ith surface intersect with each other, and represent the surface shape of that surface by the local coordinates system than to represent the shape of that surface by the absolute coordinates system (X, Y, Z) and therefore, in the embodiments wherein the constituent data of the present invention are displayed, the surface shape of the ith surface is represented by the local coordinate system.

Also, the tilt angle of the ith surface in YZ plane is represented by an angle $\theta i$ (unit:°) in which the counter-clockwise direction relative to the Z-axis of the absolute coordinates system is positive. Consequently, in the embodiments of the present invention, the origin of the local coordinates of each surface is on YZ plane in FIG. 1. There is no eccentricity of the surface in XZ plane and in XY plane. Further, the y- and z-axis of the local coordinates (x, y, z) of the ith surface are tilted by an angle $\theta i$ in YZ plane relative to the absolute coordinate system (X, Y, Z), and specifically are set as follows:

z-axis: a straight line passing through the origin of the local coordinates and counter-clockwisely forming an angle $\theta i$ in YZ plane relative to the Z-direction of the absolute coordinate system;

y-axis: a straight line passing through the origin of the local coordinates and counter-clockwisely forming 90° in YZ plane relative to z-direction; and x-axis: a straight line passing through the origin of the local coordinates and perpendicular to YZ plane.

Also, Di is a scalar amount representing the spacing between the origins of the local coordinates of the ith surface and the (i+1)th surface, and Ndi and vdi are the refractive index and abbe number, respectively, of the medium between the ith surface and the (i+1)th surface. The stop and the final imaging plane are also indicated as a plane.

The embodiments of the optical system of the present invention have a spherical surface and a rotation-asymmetrical aspherical surface. Of these, the spherical portion mentions its radius of curvature Ri as a spherical shape. The sign of the radius of curvature Ri is minus when the center of curvature is on the first surface side along the standard axis (dot-and-dash line in FIG. 1) travelling from the first surface to the image plane, and is plus when the center of curvature is on the imaging plane side.

The spherical surface is of a shape represented by the following expression:

$$Z = \frac{(x2+y2)/Ri}{1+\{1-(x2+y2)/Ri2\}1/2}$$

Also, the optical system of the present invention has at least one rotation-asymmetrical aspherical surface, and the shape thereof is represented by the following expressions:

A=(a+b)·(y2·cos2t+x2)

B=2a·b·cos t

[1+{(b−a)·y·sin t/(2a·b)}+[1+{(b−a)·y·sin t/(a·b)}−{y2/(a·b)}−{4a·b·cos2t+(a+b)2sin2t}x2/(4a2b2cos2t)]½]

Assuming so, z=A/B+C02y2+C11xy+C20x2+C03y3+C12xy2+C21x2y+C04y4+C13xy3+C22x2y2+C31x3y+C40x4+ . . .

The shape of each rotation-asymmetrical surface is made into a plane-symmetrical shape in which the yz plane is a symmetrical surface, by using only the even-number order terms regarding x of the above curved surface expression and rendering the odd number order terms 0. Also, when the following condition is satisfied, it represents a shape symmetrical with respect to the xz plane.

$$C03=C21=t=0$$

Further, when $$C02=C20C04=C40=C22/2$$

are satisfied, it represents a rotation-symmetrical shape. When the foregoing conditions are not satisfied, it represents a rotation-asymmetrical shape.

In the present embodiment, C02=C20=0 and each surface is constructed with a high-order asymmetrical aspherical surface added to the basic shape of a quadratic surface.

In each embodiment, as shown in FIG. 1, the first surface is a stop. Also, a horizontal half field angle uY is the maximum field angle of a light beam incident on the stop R1 in YZ plane of FIG. 1, and a vertical half field angle uX is the maximum field angle of a light beam incident on the stop R1 in XZ plane. Also, the diameter of an opening in the stop R1 which is the first surface is indicated as the diameter of the stop. This relates to the brightness of the optical system. The entrance pupil is positioned on the first surface and therefore, the diameter of the stop is equal to the diameter of the entrance pupil.

Also, the range of the effective image on the image plane is shown as the size of the image. The size of the image is represented by a rectangular area in which the size in y-direction of the local coordinates is horizontal and the size in x-direction is vertical.

Also, in the embodiments, the size of the optical system is shown. That size is a size determined by the effective diameter of a light beam.

Also, about the embodiments in which constituent data are mentioned, the lateral aberration graphs thereof are shown. The lateral aberration graphs show the lateral aberrations of a light beam having an incidence angle in which the horizontal incidence angles and the vertical incidence angles onto the stop R1 in each embodiment are (uY, uX), (0, uX), (-uY, uX), (uY, 0), (0, 0) and (-uY, 0). In the lateral aberration graphs, the axis of abscissas represents the incidence height onto the pupil, and the axis of ordinates represents the aberration amount. In each embodiment, basically each surface is of a plane-symmetrical shape in which yz plane is a symmetrical plane and therefore, even in the lateral aberration graphs, the plus and minus directions of the vertical field angle are the same and therefore, for the simplification of showing, the lateral aberration graph in the minus direction is not shown.

Each embodiment of the phototaking optical system will now be described.

Figure 2:
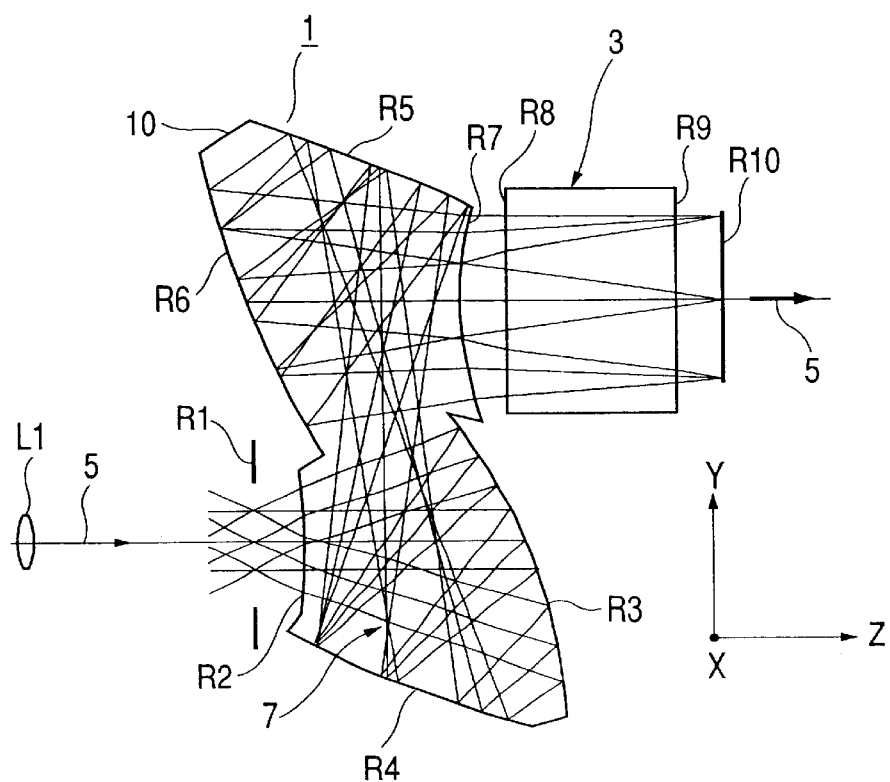
FIG. 2 is a schematic view of the c ross-section YZ of Embodiment 1 of the present invention.
Figure 3:
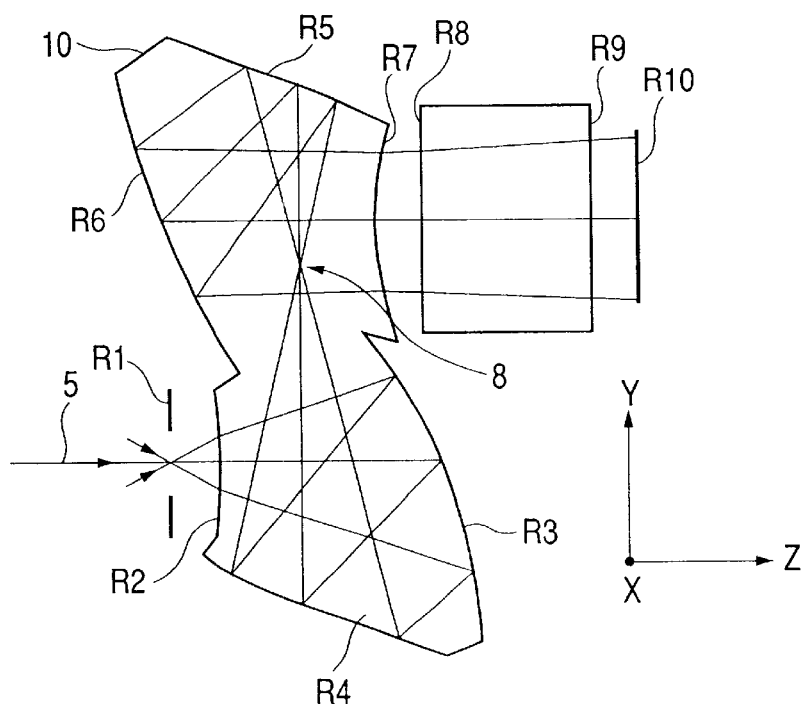
FIG. 3 is a schematic view of the cross-section YZ of Embodiment 1 of the present invention.
Figure 4:
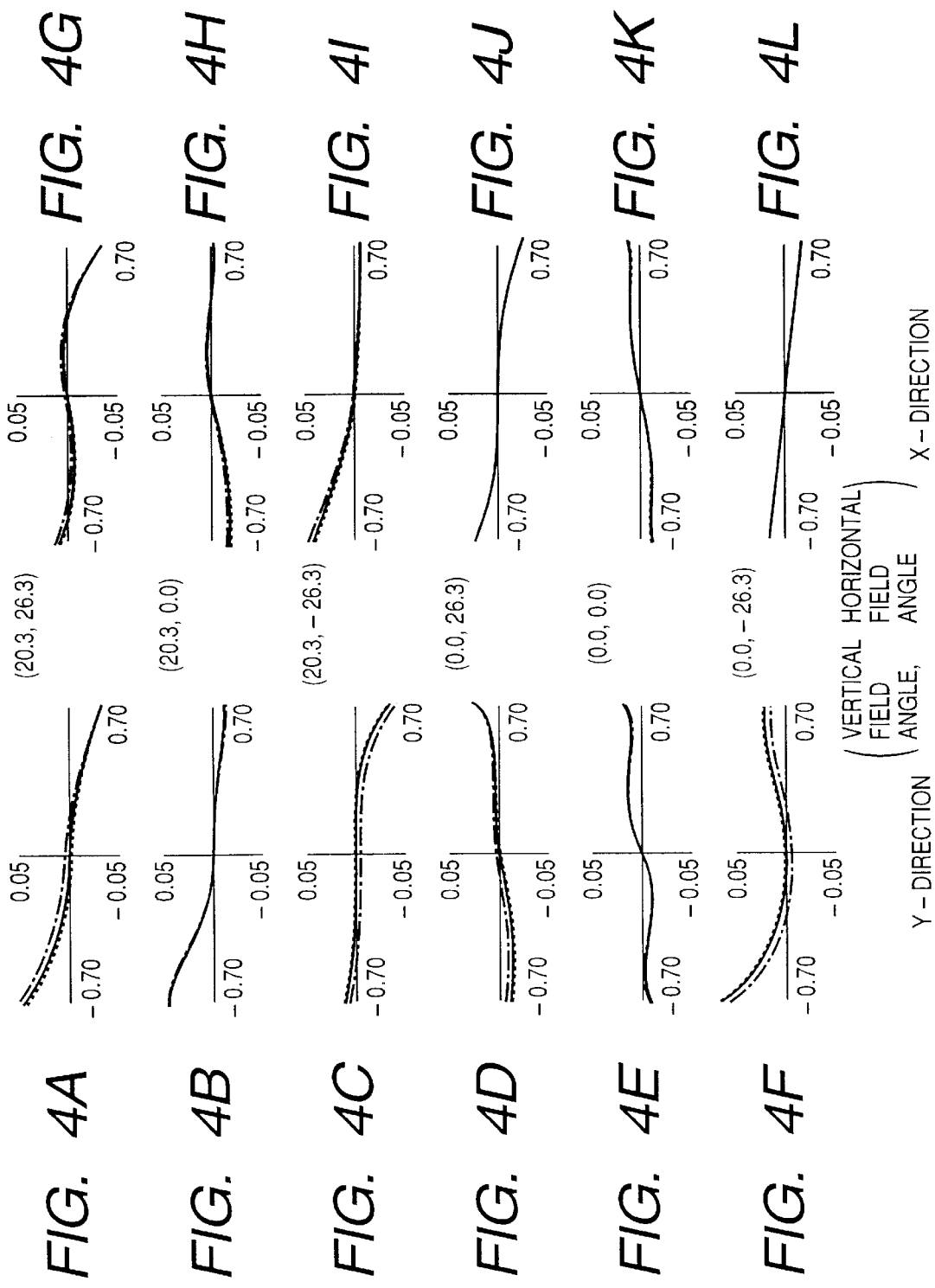
FIGS. 4A, 4B, 4C, 4D, 4E, 4F, 4G, 4H, 4I, 4J, 4K and 4L show the lateral aberration graphs of Embodiment 1 of the present invention.

FIGS. 2 and 3 are schematic views of Embodiment 1 of the phototaking optical system of the present invention in YZ cross-section. This Embodiment 1 has a phototaking field angle of a horizontal field angle 52.6° and a vertical field angle 40.6°.

In FIGS. 2 and 3, the reference numeral 1 designates the phototaking optical system. The reference numeral 10 denotes an optical element having a plurality of curved reflecting surfaces and comprised of a body formed of a transparent material such as glass or plastic, reflecting film, etc. The optical element 10 has formed on the surface thereof a concave refracting surface (emergence surface) R7 in which, in the order of passage of the ray of light from an object, each of a concave refracting surface (incidence surface) R2 having negative refracting power and each of four reflecting surfaces R3, R4, R5 and R6 has a reflecting surface (reflecting mirror) of positive or negative refracting power and having negative refracting power. R1 designates a stop (entrance pupil) disposed at the object side of the optical element 10, the reference numeral 3 denotes an optical correcting plate such as a rock crystal low-pass filter or an infrared cut filter, and R10 designates a final imaging plane on which the image pickup (light receiving) surface of an image pickup element (image pickup medium) such as a CCD is positioned. The phototaking optical system 1 has the optical element 10 and the optical correcting plate 3. The reference numeral 5 denotes the standard axis of the phototaking optical system 1. Each reflecting surface is formed by coating the surface of a transparent material with reflecting film formed of a metal or the like.

Both of the two refracting surfaces R2 and R7 of the optical element 10 comprise rotation-symmetrical spherical surfaces, and each of the reflecting surfaces R3–R6 comprises an anamorphic surface symmetrical with respect only to the YZ plane.

The imaging action in the present embodiment will now be described. In FIG. 2, a light beam L1 from an object has its incident amount regulated by the stop R1, whereafter it enters the incidence surface R2 of the optical element 10 formed of a transparent material, enters the interior of the element 10 and is reflected by the reflecting surfaces R3 and R4, whereafter it is once imaged at a position near the reflecting surface R4 (primary imaging plane) 7, and then is reflected successively by the reflecting surfaces R5 and R6, and emerges from the emergence surface R7 and is re-imaged on the final imaging plane R10 through the optical correcting plate 3. The light beam L1 from the object is intermediately imaged at the position 7 between the surface R4 and the surface R5, and as shown in FIG. 3, the pupil ray of light from the pupil R1 is intermediately imaged at the position 8 between the surface R4 and the surface R5.

In the present embodiment, the direction of the standard axis 5 incident on the incidence surface R2 of the optical element 10 and the direction of the standard axis 5 emerging from the emergence surface R7 are parallel to each other and are the same directions. Also, the standard axes including the incidence and emergence standard axes are all in the plane of the drawing sheet of FIG. 3 (YZ plane).

Thus, the optical element 10 functions as an optical unit (which can also be called a "lens unit") having desired optical performance and having positive refracting power as a whole by the refracting power of the incidence and emergence surfaces and the refracting power of a plurality of curved reflecting mirrors in the element.

This optical element 10 is such that in each surface in the optical system, when one of a plurality of rays of light leaving the center of the object surface which passes the center of the stop defined in the optical system is defined as a standard axis ray of light and this standard axis ray of light entering each surface is defined as the incidence standard axis of that surface and the standard ray of light emerging from each surface is defined as the emergence standard axis of that surface and the point of intersection between the incidence and emergence standard axes and each surface is defined as a standard point, each reflecting surface in the present embodiment is a so-called off-axial reflecting surface in which the incidence and emergence standard axes on the reflecting surface are inclined with respect to the normal on the standard point.

This optical element 10 comprises an off-axial optical element in which two refracting surfaces and two or more off-axial reflecting surfaces are integrally formed on the surface of a transparent member, and each element is set so that two axes, i.e., the incidence standard axis of a certain off-axial reflecting surface and the emergence standard axis of other off-axial reflecting surface than the off-axial reflecting surface, may intersect with each other at two locations, thereby achieving an improvement in imaging performance and the downsizing of the entire optical system.

In the present embodiment, focusing on a short distance object is effected by moving the entire phototaking optical system 1 relative to the image pickup surface R10 of the image pickup element. Particularly in the present embodiment, the direction of the standard axis 5 entering the optical element 10 and the direction of the standard axis emerging from the optical element 10 are parallel to each other and are the same and therefore, by moving the entire phototaking optical system in parallelism to the direction of the standard axis (the Z-axis direction), whereby the focusing operation can be performed as in the phototaking lens system according to the conventional art.

FIGS. 4A, 4B, 4C, 4D, 4E, 4F, 4G, 4H, 4I, 4J, 4K and 4L show the lateral aberration graphs of the phototaking optical system of the present embodiment. In the aberration graphs, dotted line represents c-line, solid lines represent d-line, and dot-and-dash lines represent f-line. As shown there, according to the present embodiment, a well balanced aberration-corrected state is obtained and excellent imaging performance is displayed.

The effects of the present embodiment will now be described.

The entrance pupil R1 is set near the first surface R2 of the optical element 10 and converging action is given to the first curved reflecting surface R3 as counted from the object side to thereby achieve the downsizing of the entire phototaking optical system. The pupil ray (principal ray) is once imaged at a stage near the incidence surface (here, on the intermediate image plane 8) to thereby make the phototaking optical system thinner. Particularly, an off-axial principal ray having left the stop R1 is converged before it widens greatly, whereby the effective diameter of each surface subsequent to the first reflecting surface R3 is made smaller by the wider angle of the phototaking optical system.

In the present embodiment, design is made such that the incidence surface R2 and emergence surface R7 of the optical element 10 have refracting power (optical power). In the present embodiment, the incidence surface R2 is made into a concave surface and the emergence surface R7 is made into a concave surface to thereby reduce the occurrence of off-axial aberrations and prevent the aggravation of chromatic aberration. The incidence surface R2 may be made into a convex surface, and according to this, the off-axial ray of light is converged by this surface R2 and the diameter of the entire light beam becomes smaller and therefore, the first reflecting surface R3 can be made smaller.

Also, the shape of the emergence surface R7 is determined so that the off-axial principal ray (pupil ray) onto this surface may be refracted at a certain angle of refraction in conformity with the angle of incidence thereof and be made substantially parallel, i.e., telecentric, on the emergence side (image side). Thereby, when an image pickup element such as a CCD is used, even if there is a gap between the color filter and the light receiving surface of the CCD, the color separating performance is effectively prevented from being varied by the angle of incidence onto the image pickup element. When the present invention is applied to a certain kind of phototaking optical system, the optical system is made telecentric on the image side so that the principal rays of on-axial and off-axial light beams may both become substantially parallel to the emergence standard axis and the angle of incidence onto the CCD may become substantially constant over the entire light receiving surface thereof.

Further, in the present embodiment, design is made such that the standard axis can be accurately measured when all the reflecting surfaces are made into a rotation-asymmetrical and an anamorphic shape and the shape of the incidence and emergence surface is made into a shape rotation-symmetrical with respect to the standard axis and the optical system is manufactured and evaluated. Also the refracting surfaces R2 and R7 are made rotation-symmetrical to thereby reduce the occurrence of rotation-asymmetrical chromatic aberration.

The present embodiment has further effects which will be described below.

Figure 14:
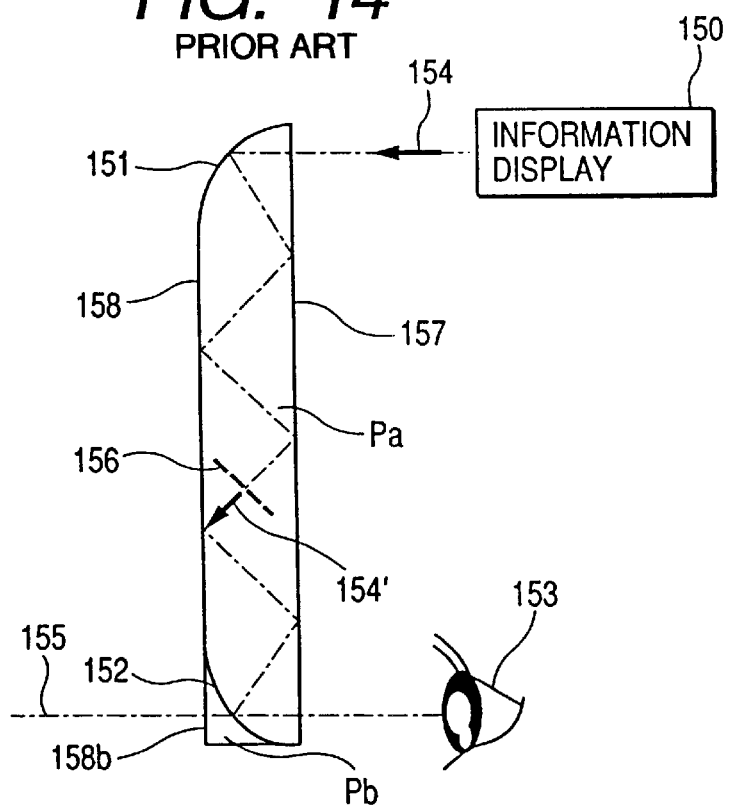
FIG. 14 is a schematic view of the essential portions of a reflection type optical system having a prism reflecting surface according to the conventional art.
Figure 15:
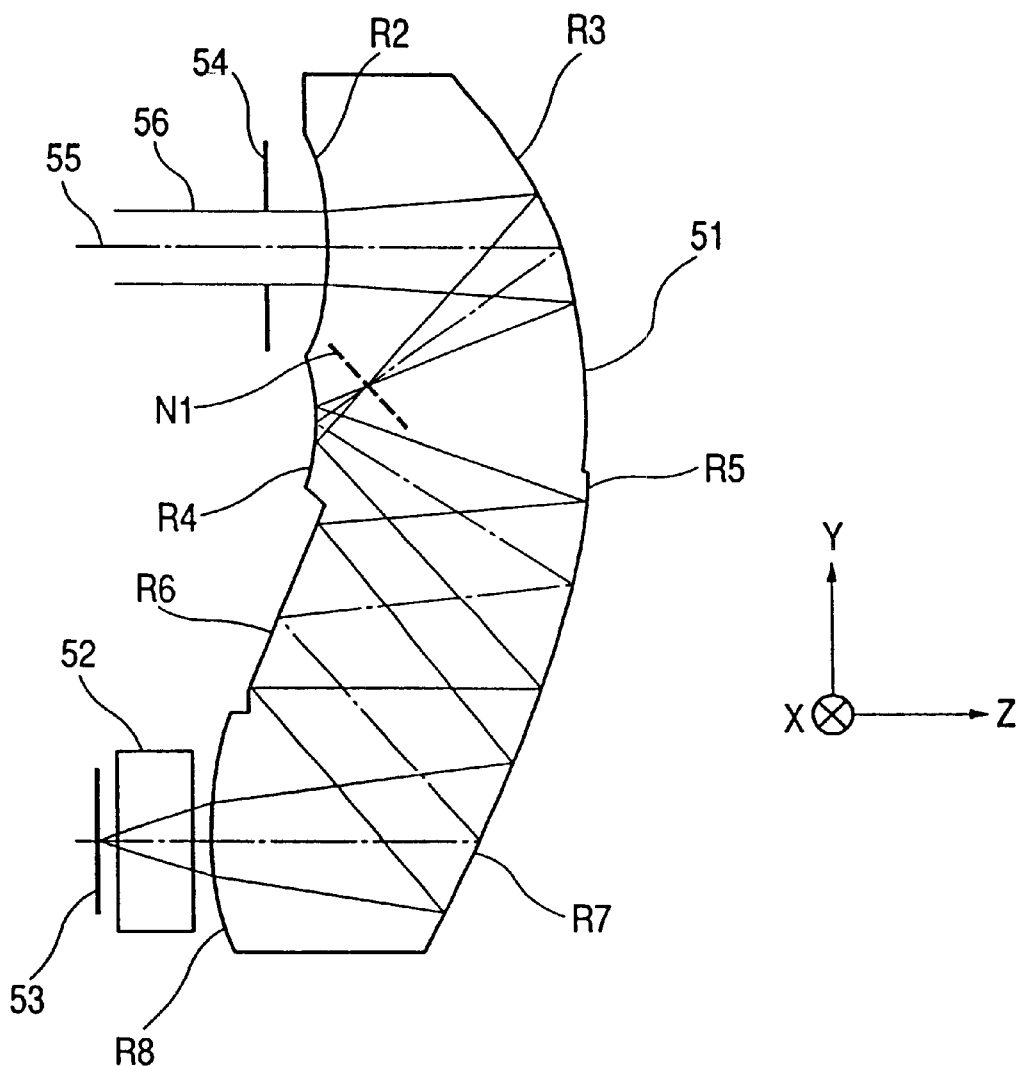
FIG. 15 is a schematic view of the essential portions of a reflection type optical system having a prism reflecting surface according to the conventional art.

In the conventional optical system shown in FIG. 14, the reflecting surfaces on the incidence side and the emergence side have refracting power, but the reflection therebetween merely plays the role of a so-called light guide for directing a light beam. In the present embodiment, four reflecting surfaces (or at least three reflecting surfaces) having refracting power are formed integrally with one another to thereby achieve a phototaking optical system of a compact and free shape and good optical performance having both of the function of bending the optical axis and the function of correcting aberrations.

In the present embodiment, as shown in FIGS. 2 and 3, the object ray L1 is intermediately imaged at a position 7 and the pupil ray is intermediately imaged at a position 8. Thus, in the present embodiment, as compared with the conventional phototaking optical system, the respective rays of light are intermediately imaged at stages near the incidence surface to thereby suppress the size of each surface of which the effective range is determined by the object ray and the pupil ray on the image side from the stop R1, and make the size of the cross-section (YZ cross-section and XY cross-section) of the optical system small.

Further, in the present embodiment, the standard axis 5 bent in the optical element 10 is contained in the same plane, i.e., the plane of the drawing sheet of FIG. 2. Thereby, coupled with the intermediate imaging of the object ray and the pupil ray in the optical element 10, the size in a direction perpendicular to the plane of the drawing sheet (X-direction) is made small.

Each reflecting surface of the optical element 10 is a so-called off-axial reflecting surface in which the plane normal at the point of intersection between the standard axis entering and emerging from the element 10 and the reflecting surface does not coincide with the direction of the standard axis. This is for constructing a compact optical element of a free shape good in space efficiency in such a manner that the eclipse occurring in the conventional mirror optical system is prevented and freer disposition can be assumed.

Particularly, in the optical element 10 of the present embodiment, the reflecting surfaces (reflecting mirrors) are disposed so that the standard axis between the surfaces R2 and R3 and the standard axis between the surfaces R4 and R5 may intersect with each other (the first intersection) and the standard axis between the surfaces R4 and R5 and the standard axis between the surfaces R6 and R7 may intersect with each other (the second intersection), and the optical path is multiplexly used, whereby the utilization efficiency of space is enhanced and the compactness of the element is achieved.

Further, the shape of each reflecting surface is made into a so-called anamorphic shape in which the radii of curvature differ from each other in two planes (yz plane and xz plane) orthogonal to each other and the powers (focal lengths) regarding the two surfaces differ from each other, thereby correcting eccentric aberration. Further, each reflecting surface is made aspherical to thereby correct various aberrations well and achieve desired optical performance.

Also, in the case of the conventional phototaking optical system, a stop (entrance pupil) is often disposed in the interior of the optical system, and this has led to the problem that the spacing between the stop and the incidence surface positioned most adjacent to the object side as viewed from the stop becomes great and the effective diameter of the ray of light on the incidence surface becomes larger with the enlargement of the angle of field. In contrast, in the present embodiment, the stop R1 is disposed just forwardly of the incidence surface R2 on the object side of the element 10 (the light beam incidence side of the optical system) to thereby suppress the bulkiness of the phototaking optical system occurring when the phototaking optical system is made wider in angle.

In the present embodiment, the disposition of each reflecting surface may be suitably changed to thereby variously change the directions of the incident standard axis and the emergent standard axis.

In the above-described embodiment, the two standard axes intersecting twice in the optical system are orthogonal to each other, but this is not always a necessary condition. Such an embodiment will be shown below.

Figure 5:
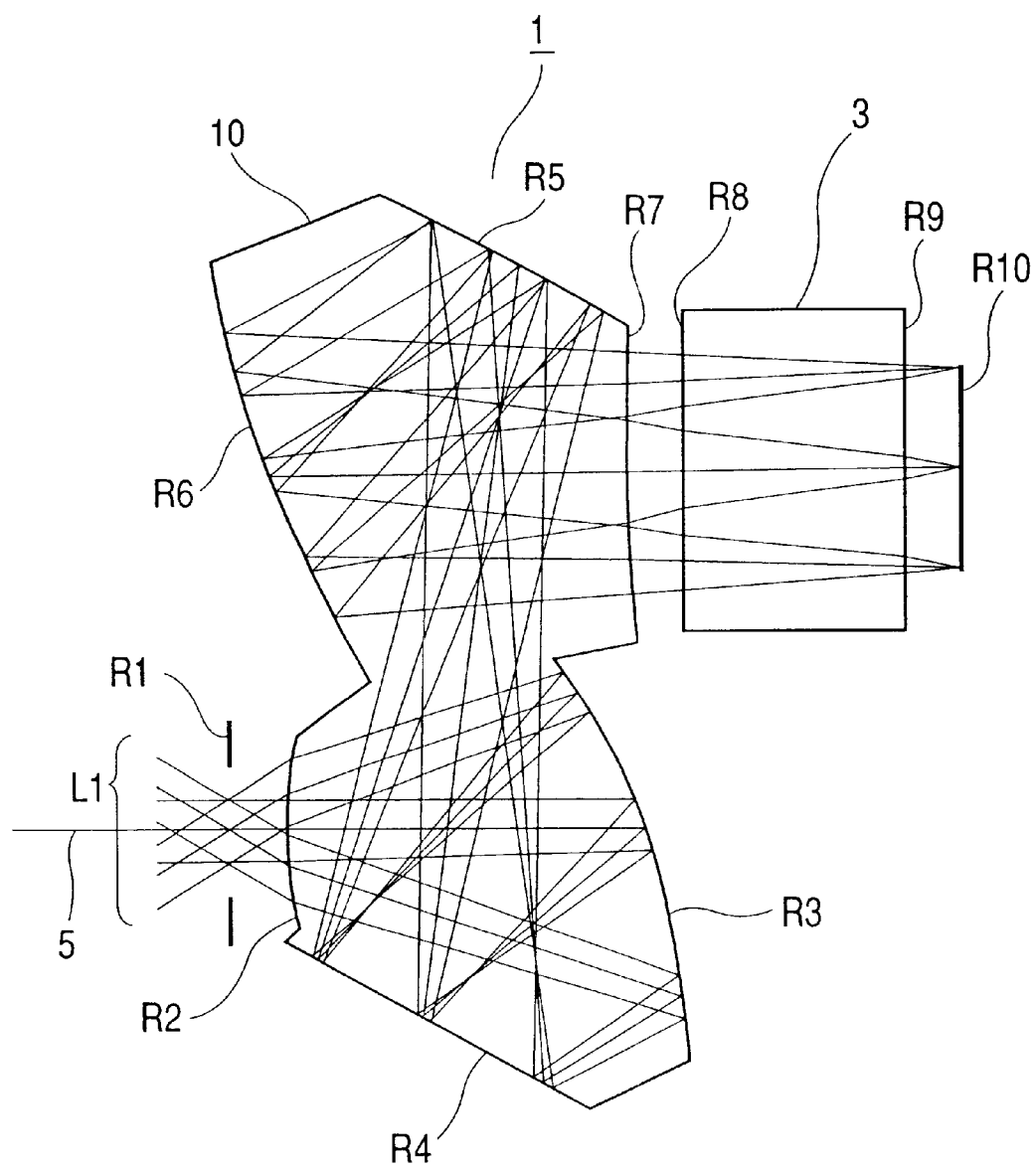
FIG. 5 is a schematic view of the cross-section YZ of Embodiment 2 of the present invention.
Figure 6:
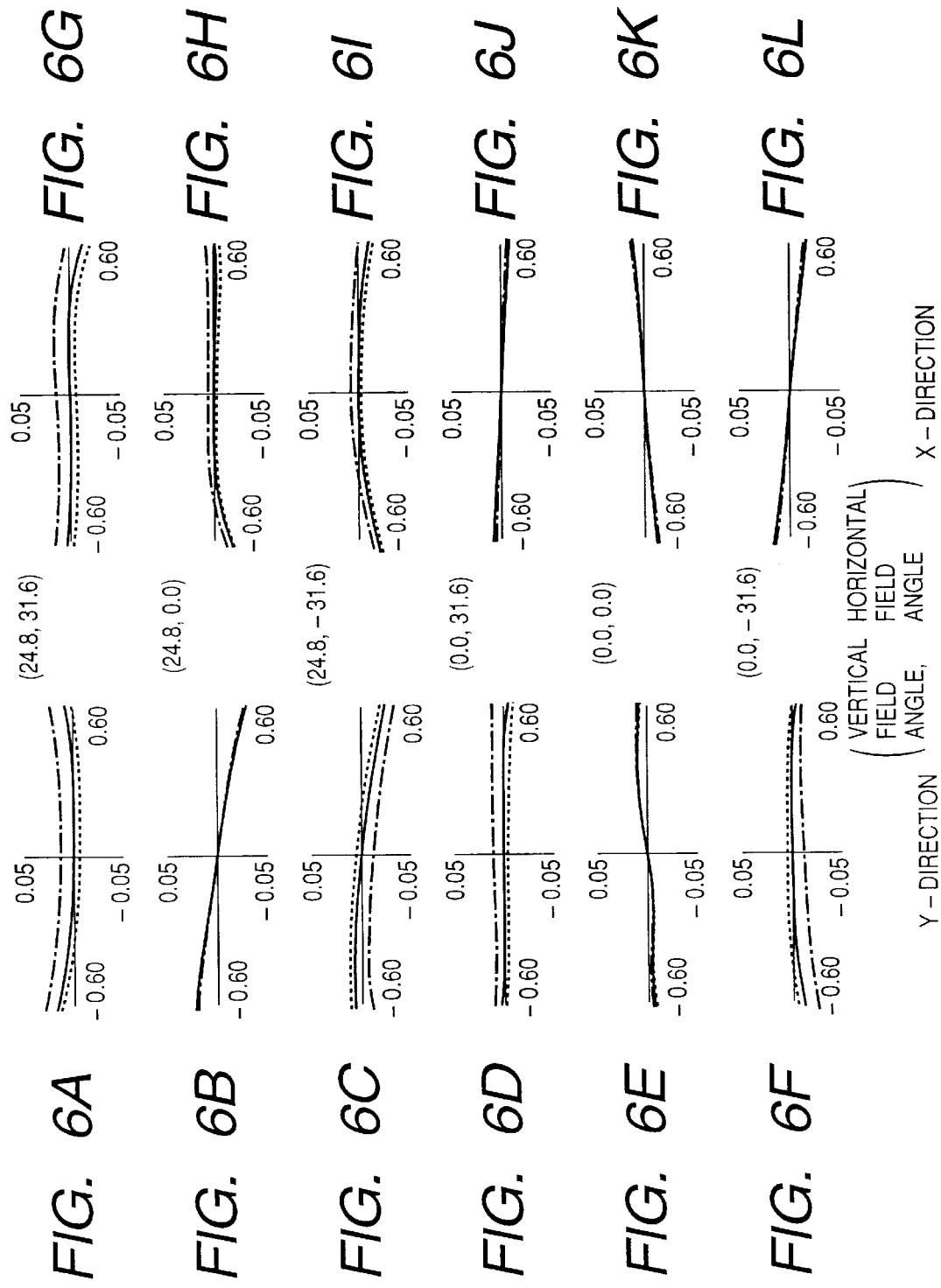
FIGS. 6A, 6B, 6C, 6D, 6E, 6F, 6G, 6H, 6I, 6J, 6K and 6L show the lateral aberration graphs of Embodiment 2 of the present invention.

FIG. 5 is a schematic view of Embodiment 2 of the optical system of the present invention in YZ cross-section. This Embodiment 2 has a phototaking field angle of a horizontal field angle 63.2° and a vertical field angle 49.6°.

In FIG. 5, the reference numeral 1 designates a phototaking optical system. The reference numeral 10 denotes an optical element having a plurality of curved reflecting surfaces and comprised of a body formed of a transparent material such as glass or plastic and reflecting film or the like. The optical element 10 has formed on the surface thereof, in the order of passage of a light beam from an object, a convex refracting surface (incidence surface) R2 having positive refracting power and four reflecting surfaces (mirrors) of positive or negative refracting power, i.e., a reflecting surface R3, a reflecting surface R4, a reflecting surface R5 and a reflecting surface R6, and a concave refracting surface (emergence surface) R7 having negative refracting power. R1 designates a stop (entrance pupil) disposed on the object side of the optical element 10, and R8 denotes a final imaging plane on which is positioned the image pickup surface (light receiving surface) of an image pickup element such as a CCD. The reference numeral 5 designates the standard axis of the phototaking optical system. The reference numeral 3 denotes the same optical correcting plate as that in the aforedescribed embodiment.

Each of the two refracting surfaces R2 and R7 comprises a rotation-symmetrical spherical surface, and each of the reflecting surfaces comprises an anamorphic aspherical surface symmetrical with respect only to the YZ plane.

The imaging action of the present embodiment will now be described. In FIG. 5, the light beam L1 from the object has its incident amount regulated by the stop (entrance pupil) R1, whereafter it enters the incidence surface R2 of the optical element 10 and is reflected by the surface R3 and thereafter, is once imaged at a position near the surface R4, and then is reflected by the surface R4, R5 and R6 in succession, and emerges from the emergence surface R7 and is re-imaged on the final imaging plane R8.

In the present embodiment, the direction of the standard axis incident on the optical element 10 and the direction of the standard axis emerging therefrom are parallel to each other and the same. Also, the standard axes including the incidence and emergence standard axes are all in the plane of the drawing sheet of FIG. 5 (YZ plane).

Thus, the optical element 10 functions as an optical unit having desired optical performance and having positive refracting power as a whole, by the refracting power of the incidence and emergence surfaces and the refracting power of a plurality of curved reflecting surfaces in the element.

FIGS. 6A, 6B, 6C, 6D, 6E, 6F, 6G, 6H, 6I, 6J, 6K and 6L show the lateral aberration graphs of the present embodiment. In the aberration graphs, dotted lines represent c-line, solid lines represent d-line, and dot-and-dash line represent f-line.

Again in this embodiment, the reflecting surfaces are disposed in an arrangement wherein the standard axis between the surfaces R2 and R3 and the standard axis between the surfaces R4 and R5 intersect with each other (the first intersection) and the standard axis between the surfaces R4 and R5 and the standard axis between the surfaces R6 and R7 intersect with each other (the second intersection), that is, the optical path is multiplexly used, thereby enhancing the utilization efficiency of space and achieving the compactness of the phototaking optical system.

Further, as a feature of the present embodiment, the angles of reflection on the reflecting surfaces are smaller than in Embodiment 1. By disposing so, eccentric aberration occurring on each reflecting surface eccentric relative to the standard axis is suppressed to a small amount.

In the above-described two embodiments, the standard axes intersect at two locations. An example in which the standard axes intersect at one location will be shown below.

Figure 7:
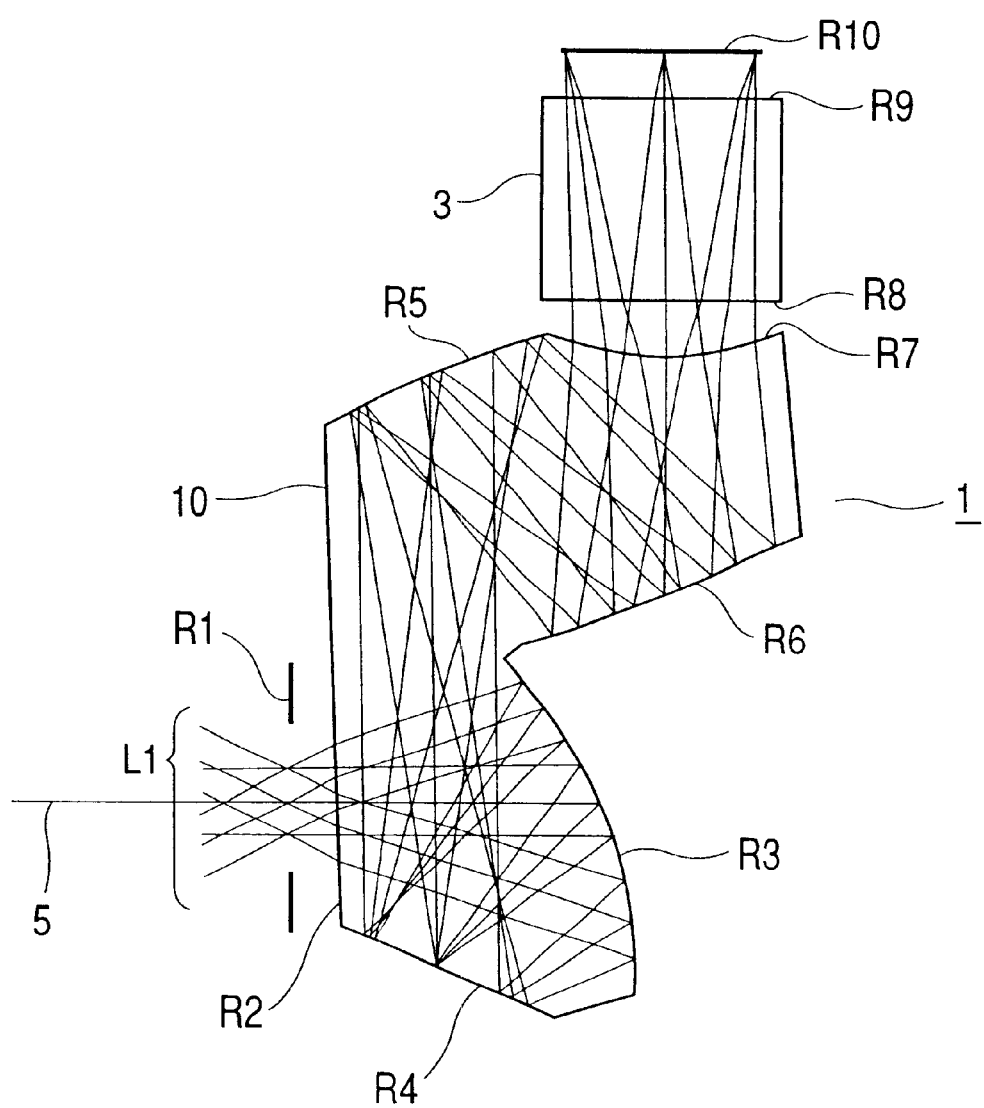
FIG. 7 is a schematic view of the cross-section YZ of another embodiment of the present invention.
Figure 8:
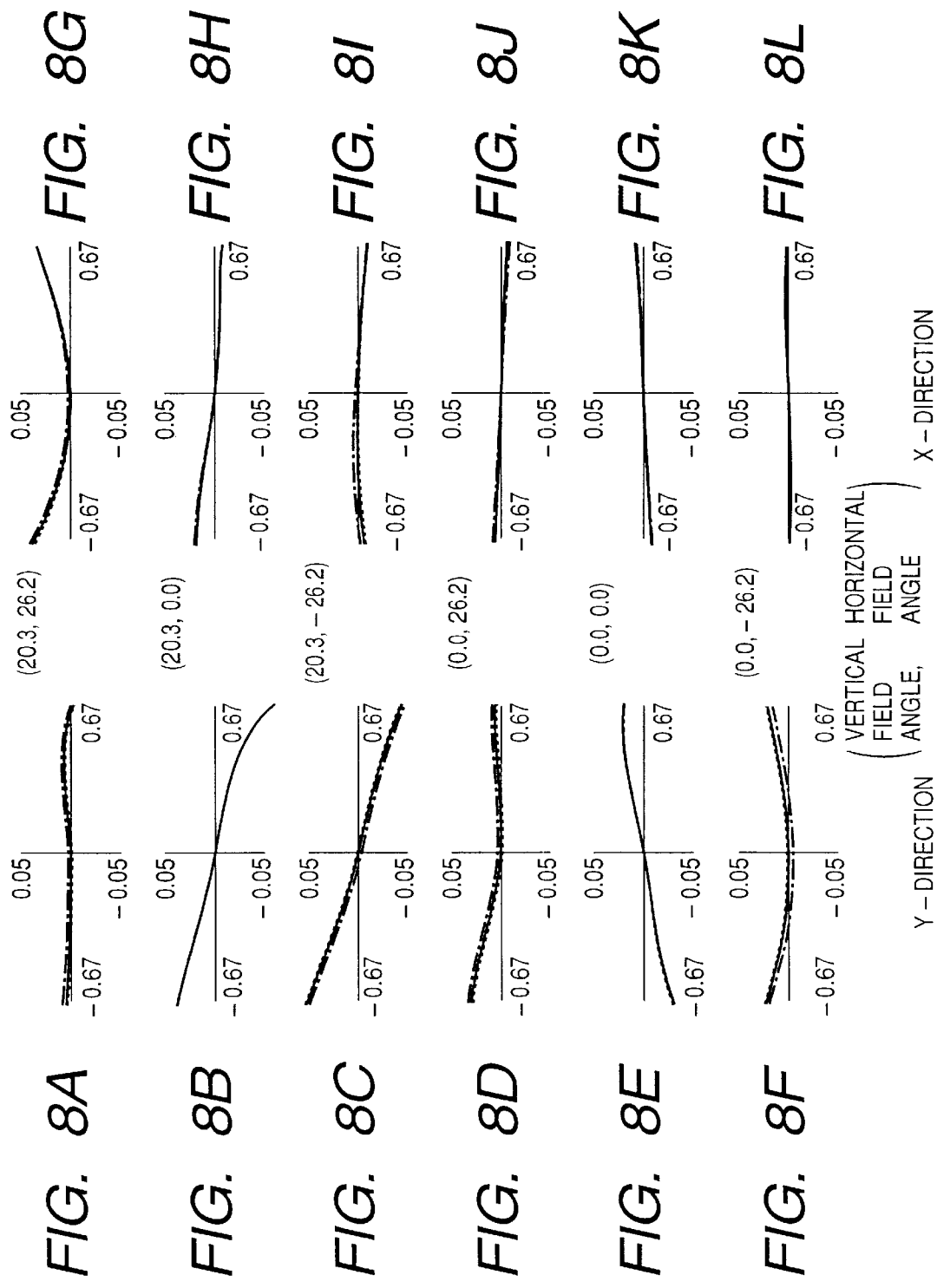
FIGS. 8A, 8B, 8C, 8D, 8E, 8F, 8G, 8H, 8I, 8J, 8K and 8L show the lateral aberration graphs of another embodiment of the present invention.
Figure 9:
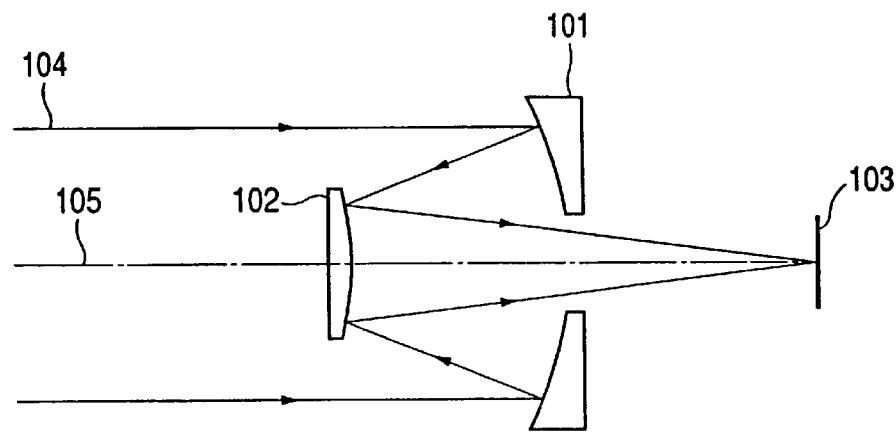
FIG. 9 is an illustration of a Cassegrainian type reflection telescope according to the conventional art.
Figure 10:
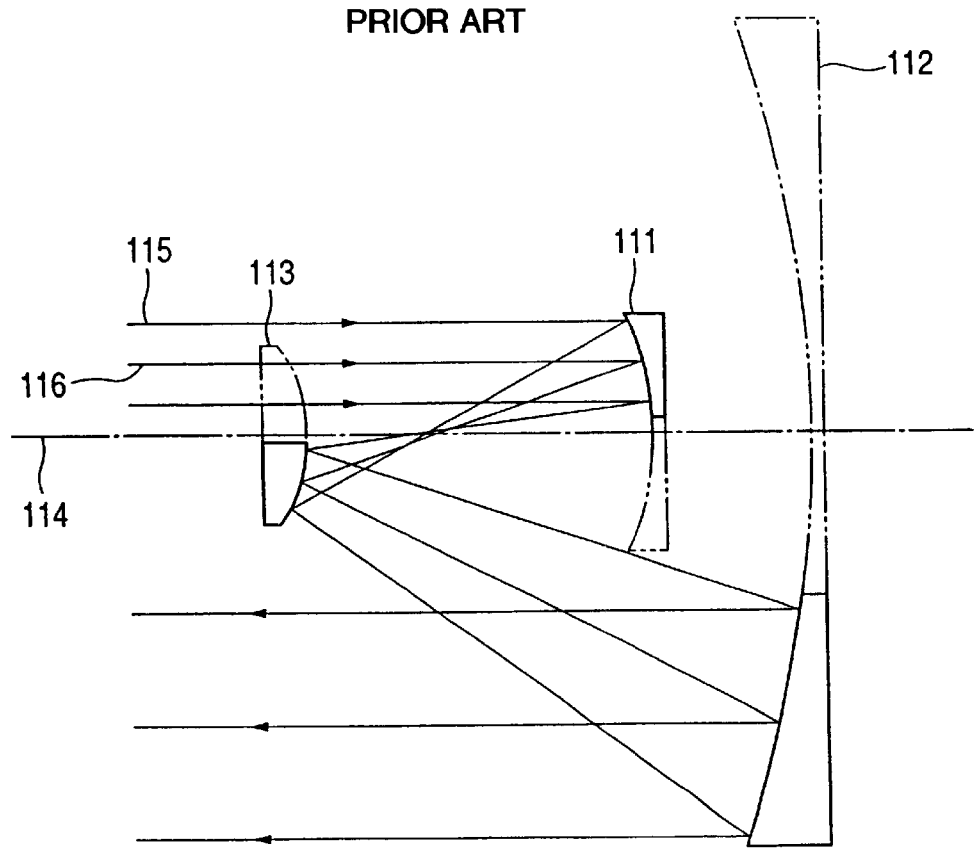
FIG. 10 is a schematic view of the essential portions of a reflection type optical system according to the conventional art.
Figure 11:
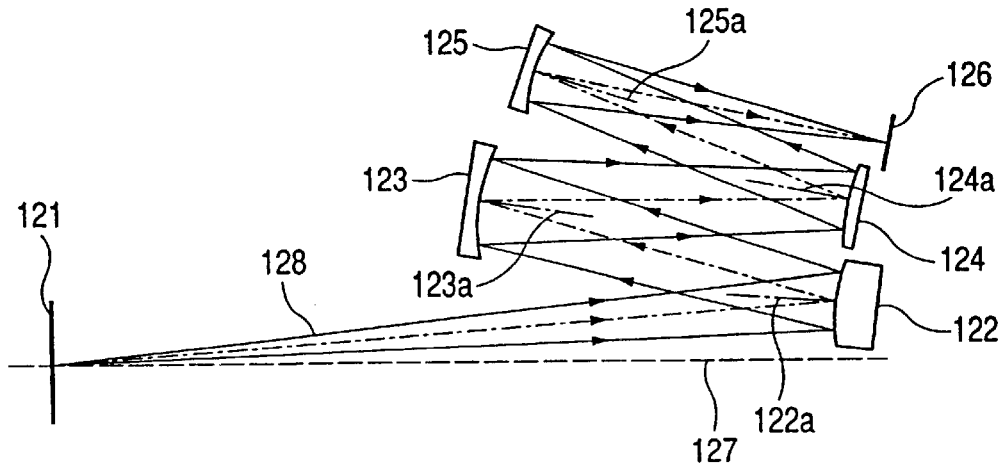
FIG. 11 is a schematic view of the essential portions of a reflection type optical system according to the conventional art.
Figure 12:
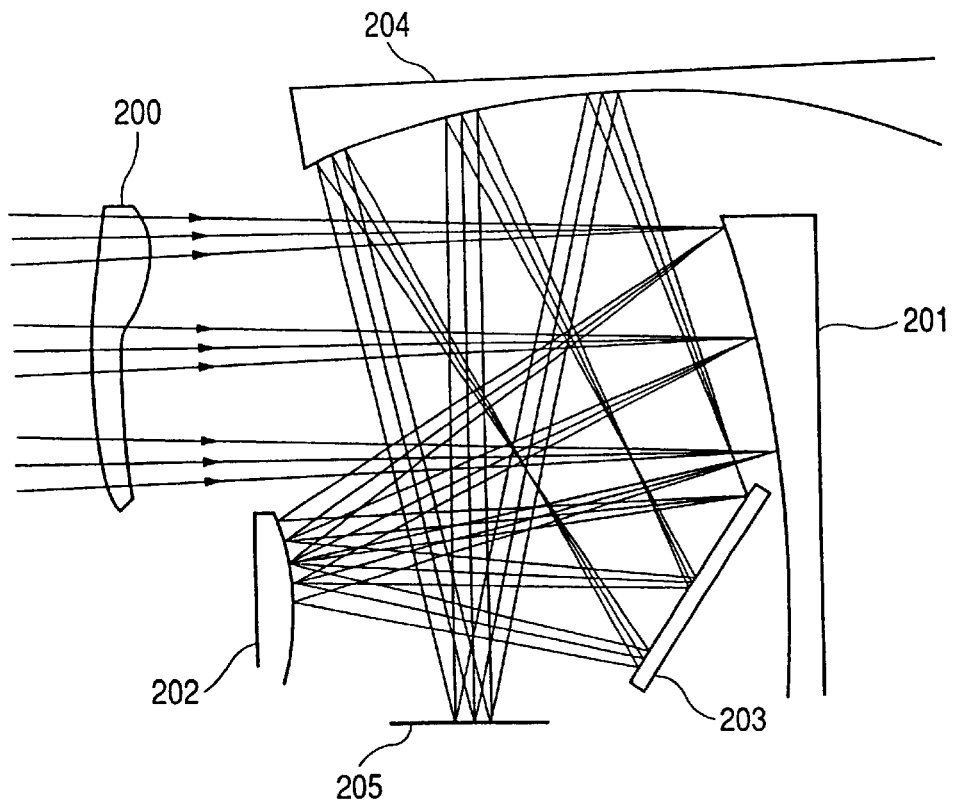
FIG. 12 is a schematic view of the essential portion of a reflection type optical system according to the conventional art.
Figure 13:
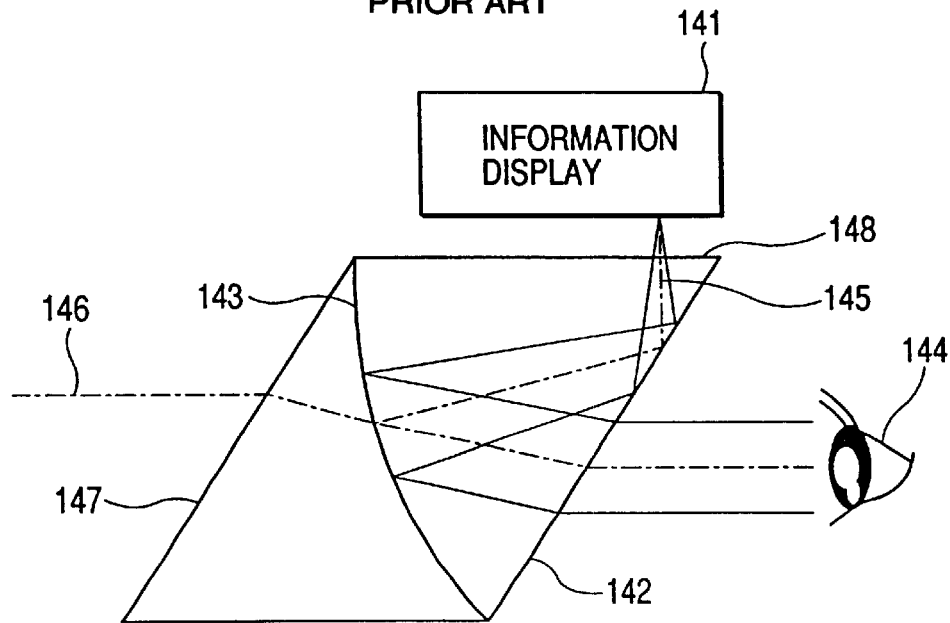
FIG. 13 is a schematic view of the essential portions of a reflection type optical system having a prism reflecting surface according to the conventional art.

FIG. 7 is a schematic view of another embodiment of the optical system of the present invention in YZ cross-section. This Embodiment 3 has a phototaking angle of field of a horizontal field angle 52.6° and a vertical field angle 40.6°.

In FIG. 7, the reference numeral 1 designates a phototaking optical system. The reference numeral 10 denotes an optical element having a plurality of curved reflecting surfaces and comprised of a body formed of a transparent material such as glass or plastic and reflecting film or the like. The optical element 10 has formed on the surface thereof, in the order of passage of a ray of light from an object, a concave refracting surface (incidence surface) R2 having negative refracting power, and four reflecting surfaces of positive or negative refracting power, i.e., a reflecting surface R3, a reflecting surface R4, a reflecting surface R5 and a reflecting surface R6, and a concave refracting surface (emergence surface) R7 having negative refracting power. R1 designates a stop (entrance pupil) disposed on the object side of the optical element 10, and R8 denotes a final imaging plane on which is positioned the image pickup surface of an image pickup element such as a CCD. The reference numeral 5 designates the standard axis of the phototaking optical system. The reference numeral 3 denotes the same optical correcting plate as that in the aforedescribed two embodiments.

Each of the two refracting surfaces R2 and R7 comprises a rotation-symmetrical spherical surface, and each reflecting surface comprises an anamorphic aspherical surface symmetrical with respect only to YZ plane.

The imaging action of the present embodiment will now be described. A light beam L1 from an object has its incident amount regulated by a stop (entrance pupil) R1, whereafter it enters the emergence surface R2 of the optical element 10, is reflected by the surface R3, and thereafter is once imaged at a position near the surface R4, and then is reflected by the surfaces R4, R5 and R6 in succession, and emerges from the emergence surface R7 and is re-imaged on the final imaging plane R8.

In the present optical system, the direction of the standard axis entering the optical element 10 and the direction of the standard axis emerging from the optical axis 10 are orthogonal to each other. Also, the standard axes including the incidence and emergence standard axes are all in the plane of the drawing sheet of FIG. 7 (YZ plane).

This optical element 10 functions as an optical unit having desired optical performance and having positive refracting power as a whole, by the refracting power of the incidence and emergence surfaces and the refracting power of a plurality of curved reflecting mirrors in the element 10.

FIGS. 8A, 8B, 8C, 8D, 8E, 8F, 8G, 8H, 8I, 8J, 8K and 8L show the lateral aberration graphs of the present optical system. In the aberration graphs, dotted lines represent c-line, solid lines represent d-line, and dot-and-dash lines represent f-line.

In this example, the reflecting surfaces are disposed so that the standard axis between the surfaces R2 and R3 and the standard axis between the surfaces R4 and R5 may intersect with each other, and the optical path is multiplexly used, thereby enhancing the utilization efficiency of space and making the phototaking optical system compact.

In all of the above-described embodiments, the stop is positioned most adjacent to the object side of the optical system, but in the embodiments of the present invention, the pupil is actually imaged in the optical system and therefore, in some cases, the optical element may be divided into two with the imaged position as the boundary and the stop may be provided therebetween. If this is done, the entrance pupil will be formed most adjacent to the object side of the optical system as in the above-described embodiments, and the optical system will become an optical system equivalent to the above-described embodiments, and similar effects will be obtained. If the entrance pupil at this time is formed more adjacent to the object side than the first curved reflecting surface as counted from the object side of the optical element on which the light beam from the object impinges at first, effects similar to those of the above-described embodiments will be obtained.

Also, each of the above-described embodiments is an optical system constructed by the use of only one off-axial optical element in which the standard axes intersect with each other once or twice, whereas the present invention is not restricted thereto. For example, the optical system may be constructed by combining such an optical element and an off-axial optical element in which the standard axes do not intersect with each other even once, or by combining such an optical element and an optical element constructed of only surfaces rotation-symmetrical with respect to the standard axis.

Also, the present invention is applicable not only to a phototaking optical system, but to various optical systems such as an observation optical system and a measuring optical system.

Also, in the present invention, the frequency of the intersection between the standard axes may be three or four times. Also, the present invention can be applied not only to a solid reflecting optical system like the optical element 10, but to a hollow reflecting optical system.

Numerical value embodiments of the optical systems of the above-described three embodiments will be shown below.

Numerical Value Embodiment 1
  horizontal half field angle: 26.3 [degree]
  vertical half field angle: 20.3 [degree]
  stop diameter: 1.40 [mm]
  image size: horizontal 3.76 [mm]×vertical 2.82 [mm]
  size of the optical system: (X×Y×Z)=6.4×13.9×12.0

| i | Yi | Zi | θi | Di | Ndi | νdi | |
|---|------|-------|-------|-------|---------|-------|-------------------|
|   |      |       |       |       |         |       | stop |
| 1 | 0.00 | 0.00  | 0.00  | 1.20  | 1       |       |                   |
| 2 | 0.00 | 1.20  | 0.00  | 5.13  | 1.48911 | 57.40 | refracting surface |
| 3 | 0.00 | 6.33  | 22.50 | 4.62  | 1.48911 | 57.40 | reflecting surface |
| 4 | -3.27| 3.07  | 67.50 | 12.00 | 1.48911 | 57.40 | reflecting surface |
| 5 | 8.73 | 3.07  | 67.50 | 4.56  | 1.48911 | 57.40 | reflecting surface |
| 6 | 5.51 | -0.16 | 22.50 | 5.00  | 1.48911 | 57.40 | reflecting surface |
| 7 | 5.51 | 4.84  | 0.00  | 1.10  | 1       |       | refracting surface |
| 8 | 5.51 | 5.94  | 0.00  | 4.00  | 1.51386 | 64.15 | refracting surface |
| 9 | 5.51 | 9.94  | 0.00  | 1.00  | 1       |       | refracting surface |
| 10| 5.51 | 10.94 | -0.00 |       | 1       |       | image plane |

Spherical Surface Shape
  R2 surface $r2=-12.500$
  R7 surface $r7=7.045$
  R8 surface $r8=\infty$
  R9 surface $r9=\infty$
Aspherical Surface Shape
  R3 surface R3 surface

| | | |
|---|---|---|
| a = -2.77493e+00 | b = 5.58952e+00 | t = 1.16070e+01 |
| C03 = 1.14079e-03 | C21 = 1.27961e-03 | |
| C04 = -4.29051e-05 | C22 = -5.16987e-04 | C40 = -2.15720e-04 |
| C05 = -2.56467e-05 | C23 = 1.38371e-06 | C41 = -2.03011e-04 |
| C06 = -1.97701e-05 | C24 = 1.68225e-05 | C42 = -3.14637e-06 |
| | | c60 = 5.93222e-06 |

R4 surface

| | | |
|---|---|---|
| a = -8.64277e+00 | b = 4.47924e+00 | t = 2.78791e+01 |
| C03 = -1.04373e-03 | C21 = -1.73032e-03 | |
| C04 = 1.15540e-04 | C22 = -1.08129e-03 | C40 = 3.72197e-04 |
| C05 = -6.27700e-05 | C23 = 2.12893e-04 | C41 = -2.97720e-04 |
| C06 = -7.19742e-05 | C24 = 1.41050e-04 | C42 = -7.55143e-05 |
| | | c60 = 1.90205e-05 |

R5 surface

| | | |
|---|---|---|
| a = -4.38725e+00 | b = 7.21568e+00 | t = -1.02898e+00 |
| C03 = 6.38884e-04 | C21 = 1.15941e-03 | |
| C04 = 3.76781e-04 | C22 = 8.23049e-05 | C40 = 4.13342e-04 |
| C05 = 4.68976e-05 | C23 = 4.13808e-05 | C41 = 5.51206e-05 |
| C06 = -3.22259e-05 | C24 = -6.34422e-05 | C42 = -1.50110e-04 |
| | | c60 = -4.04769e-05 |

R6 surface

| | | |
|---|---|---|
| a = 2.60391e+01 | b = 1.54778e+01 | t = -3.21335e+01 |
| C03 = 3.59243e-04 | C21 = 6.61958e-04 | |
| C04 = 3.74370e-04 | C22 = 7.81130e-04 | C40 = 3.29049e-04 |
| C05 = 1.65377e-05 | C23 = -6.37240e-06 | C41 = 2.33652e-05 |
| C06 = -1.06258e-05 | C24 = -2.16928e-05 | C42 = -4.08664e-05 |
| | | c60 = -1.15532e-05 |

Numerical Value Embodiment 2
  horizontal half field angle: 31.6 [degree]
  vertical half field angle: 24.8 [degree]
  stop diameter: 1.20 [mm]
  image size: horizontal 3.76 [mm]×vertical 2.82 [mm]
  size of the optical system: (X×Y×Z)=8.6×16.3×13.4

| i | Yi | Zi | θi | Di | Ndi | νdi | |
|---|----|----|----|----|-----|-----|---|
| 1 | 0.00 | 0.00 | 0.00 | 1.10 | 1 | | stop |
| 2 | 0.00 | 1.10 | 0.00 | 6.50 | 1.49171 | 57.40 | refracting surface |
| 3 | 0.00 | 7.60 | 20.00 | 5.40 | 1.49171 | 57.40 | reflecting surface |
| 4 | −3.47 | 3.46 | 61.00 | 14.00 | 1.49171 | 57.40 | reflecting surface |
| 5 | 10.39 | 5.41 | 61.00 | 6.00 | 1.49171 | 57.40 | reflecting surface |
| 6 | 6.54 | 0.82 | 20.00 | 6.50 | 1.49171 | 57.40 | reflecting surface |
| 7 | 6.54 | 7.32 | 0.00 | 1.10 | 1 | | refracting surface |
| 8 | 6.54 | 8.42 | 0.00 | 4.00 | 1.51683 | 64.15 | refracting surface |
| 9 | 6.54 | 12.42 | 0.00 | 1.00 | 1 | | refracting surface |
| 10 | 6.54 | 13.42 | 0.00 | | 1 | | image plane |

Shperical Surface Shape
  R2 surface r2=9.091
  R7 surface r7=37.333
  R8 surface r8=∞
  R9 surface r9=∞
Aspherical Surface Shape
  R3 surface R3 surface a = −3.58426e+00    b = 1.01124e+01     t = 8.94965e+00
C03 = 1.42730e−03   C21 = −3.57382e−04
C04 = −5.49059e−05  C22 = −2.88742e−04  C40 = −4.97790e−04
C05 = −1.01225e−05  C23 = −1.76055e−04  C41 = −2.73213e−05
C06 = 6.49716e−06   C24 = 4.88763e−05   C42 = −2.50826e−05
                                        c60 = 2.20583e−05

R4 surface a = −6.89202e+00    b = 6.71475e+00     t = 8.66201e+01
C03 = 2.09498e−03   C21 = −7.18557e−03
C04 = 8.29873e−04   C22 = 2.92526e−03   C40 = −1.26439e−03
C05 = −8.69547e−05  C23 = 7.20684e−04   C41 = 4.72981e−04
C06 = −3.56705e−05  C24 = 9.37447e−05   C42 = 9.96268e−05
                                        c60 = 3.07278e06

R5 surface a = −8.49766e+00    b = 1.35269e+01     t = −4.31604e−01
C03 = 7.51919e−04   C21 = 1.51762e−03
C04 = 1.53364e−04   C22 = −6.96054e−05  C40 = −3.51172e−05
C0S = 4.45608e−06   C23 = 9.99217e−05   C41 = −1.02168e−05
C06 = −2.97082e−06  C24 = 1.00603e−05   C42 = −1.62164e−05
                                        c60 = 5.48157e−06

R6 surface a = 2.67660e+01     b = 1.69261e+01     t = −2.39175e+01
C03 = 3.18923e−04   C21 = 8.26751e−04
C04 = 7.76928e−05   C22 = 1.52824e−05   C40 = −1.61505e−05
C05 = 4.05655e−06   C23 = 3.14394e−05   C41 = 3.53805e−06
C06 = 5.04297e−07   C24 = 2.86189e−06   C42 = −6.83023e−06
                                        c60 = 1.33038e−06

Numerical Value Embodiment 3
  horizontal half field angle: 26.3 [degree]
  vertical half field angle: 20.3 [degree]
  stop diameter: 1.34 [mm]
  image size: horizontal 3.76 [mm]×vertical 2.82 [mm]
  size of the optical system: (X×Y×Z)=8.6×19.3×9.8

| i | Yi | Zi | θi | Di | Ndi | νdi | |
|---|----|----|----|----|-----|-----|---|
| 1 | 0.00 | 0.00 | 0.00 | 1.10 | 1 | | stop |
| 2 | 0.00 | 1.10 | 0.00 | 5.13 | 1.48781 | 57.40 | refracting surface |
| 3 | 0.00 | 6.23 | 22.50 | 4.62 | 1.48781 | 57.40 | reflecting surface |
| 4 | −3.27 | 2.97 | 67.50 | 12.00 | 1.48781 | 57.40 | reflecting surface |
| 5 | 8.73 | 2.97 | 67.50 | 6.50 | 1.48781 | 57.40 | reflecting surface |
| 6 | 4.14 | 7.56 | 67.50 | 5.00 | 1.48781 | 57.40 | reflecting surface |
| 7 | 9.14 | 7.56 | 90.00 | 1.10 | 1 | | refracting surface |
| 8 | 10.24 | 7.56 | 90.00 | 4.00 | 1.51260 | 64.15 | refracting surface |
| 9 | 14.24 | 7.56 | 90.00 | 1.00 | 1 | | refracting surface |
| 10 | 15.24 | 7.56 | 90.00 | | 1 | | image plane |

Spherical Surface Shape
  R2 surface r2=−16.667
  R7 surface r7=6.389
  R8 surface r8=∞
  R9 surface r9=∞
Aspherical Surface Shape
  R3 surface R3 surface a = −3.33030e+01    b = −5.01209e+00    t = 2.68993e+01
C03 = −2.10140e−03  C21 = −8.86845e−03
C04 = −4.85393e−06  C22 = 2.74160e−04   C40 = 4.95810e−05
R4 surface a = −3.73089e+00    b = 3.72311e+00     t = 8.97482e+01
C03 = 1.79317e−03   C21 = −3.26620e−03
C04 = −7.79662e−04  C22 = 7.24453e−04   C40 = −3.07120e−04
R5 surface a = −1.15368e+01    b = −5.03463e+01    t = −2.53006e+01
C03 = 4.29718e−04   C21 = 9.50160e−04
C04 = 6.21381e−05   C22 = 2.90865e−05   C40 = 3.35396e−06
R6 surface a = 4.65734e+00     b = −7.02662e+00    t = 5.46721e+00
C03 = 1.65705e−03   C21 = 3.64990e−03
C04 = 3.68262e−05   C22 = −2.42660e−05  C40 = 7.97433e−06

What is claimed is:

1. An optical system comprising:

a stop; and an optical element which is integrally provided with a plurality of curved reflecting surfaces, wherein in said optical element, an optical path of a ray of light, successively reflected by said plurality of curved reflecting surfaces and arriving at the center of an image plane via the center of said stop, intersects itself any of twice, three times, and four times, and wherein at least one of said plurality of curved reflecting surfaces has a rotation-asymmetrical shape.

2. An observation apparatus comprising the optical system of claim 1.

3. An optical system according to claim 1, wherein an opening in said stop and the image plane are parallel to each other.

4. An optical system according to claim 1, wherein said stop is provided on the light incidence side of a system comprising a plurality of curved reflecting surfaces.

5. An optical system according to claim 4,
wherein one of said plurality of curved reflecting surfaces which is nearest to said stop is a concave surface.

6. An optical system according to claim 1,
wherein the number of said curved reflecting surfaces is four.

7. An optical system according to claim 6,
wherein said stop is provided on the light incidence side of a system comprising said four curved reflecting surfaces.

8. An optical system according to claim 7,
wherein one of said four curved reflecting surfaces which is nearest to said stop is a concave surface.

9. An optical system according to claim 8, wherein the optical path of the ray is orthogonal to itself at its respective intersecting positions.

10. An optical system according to claim 9,
wherein an opening in said stop and the image plane are parallel to each other.

11. An optical system according to claim 1, wherein each of said plurality of curved reflecting surfaces comprises a rotation-asymmetrical aspherical surface, and the ray of light obliquely impinges thereon.

12. An optical system according to claim 11, wherein said plurality of curved reflecting surfaces are supplied on a transparent member, and the ray of light is successively reflected by said plurality of curved reflecting surfaces while propagating through the interior of said transparent member.

13. An optical system according to claim 12,
wherein both of the light incidence surface and the light emergence surface of said transparent member are curved surfaces.

14. An image pickup apparatus comprising the optical system of claim 1.

15. An optical system comprising:
an optical element which is integrally provided with a plurality of curved reflecting surfaces,
wherein in said optical element, an optical path of a ray of light, successively reflected by said plurality of curved reflecting surfaces, intersects itself any of twice, three times, and four times, and
wherein at least one of said plurality of curved reflecting surfaces has a rotation-asymmetrical shape.

16. An image pickup apparatus comprising the optical system of claim 15.

17. An observation apparatus comprising the optical system of claim 15.

18. An optical system according to claim 15, wherein the direction in which the ray of light enters said optical system and the direction in which the ray of light emerges from said optical system are the same.

19. An optical system according to claim 15, further comprising a stop on the light incidence side of a system comprising said plurality of curved reflecting surfaces.

20. An optical system according to claim 19,
wherein one of said plurality of curved reflecting surfaces which is nearest to said stop is a concave surface.

21. An optical system according to claim 15,
wherein the number of said curved reflecting surfaces is four.

22. An optical system according to claim 21,
wherein said stop is provided on the light incidence side of a system comprising said four curved reflecting surfaces.

23. An optical system according to claim 22,
wherein one of said four curved reflecting surfaces which is nearest to said stop is an concave surface.

24. An optical system according to claim 23, wherein the optical path of the ray of light intersects itself orthogonally at its respective intersecting positions.

25. An optical system according to claim 23,
wherein an opening in said stop and an image plane are parallel to each other.

26. An optical system according to claim 15, wherein each of said plurality of curved reflecting surfaces comprises a rotation-asymmetrical aspherical surface, and the ray of light obliquely impinges thereon.

27. An optical system according to claim 26, wherein said plurality of curved reflecting surfaces are supplied on a transparent member, and the ray of light is successively reflected by said plurality of curved reflecting surfaces while propagating through the interior of said transparent member.

28. An optical system according to claim 27, wherein both of the light incidence surface and the light emergence surface of said transparent member are curved surfaces.

29. An optical system according to claim 1 or 15, wherein the optical path intersects itself twice.

30. An optical system according to claim 1 or 15, wherein the optical path intersects itself three times.

31. An optical system according to claim 1 or 15, wherein the optical path intersects itself four times.

* * * * *

UNITED STATES PATENT AND TRADEMARK OFFICE
CERTIFICATE OF CORRECTION

PATENT NO.   : 6,268,963 B1
DATED        : July 31, 2001
INVENTOR(S)  : Takeshi Akiyama It is certified that error appears in the above-identified patent and that said Letters Patent is hereby corrected as shown below:

Column 2,
Line 29, "a focal" should read -- afocal --.

Column 5,
Lines 34, 36, 39, 42, 45 and 50, "the another" should read -- another --.

Column 6,
Line 7, "c ross" should read -- cross --.

Column 7,
Line 56, "coordinates" should read -- coordinate --.

Column 9,
Line 10, "C20C04" should read -- C20  C04 --.

Column 17,
Line 30, "Shperical" should read -- Spherical --.
Line 58, "COS" should read -- CO5 --.

Signed and Sealed this

Second Day of April, 2002

Attest:

*Attesting Officer*

JAMES E. ROGAN
*Director of the United States Patent and Trademark Office*